United States Patent
Kung et al.

(10) Patent No.: US 8,567,385 B2
(45) Date of Patent: Oct. 29, 2013

(54) FRET SAW INCLUDING A CUTTING WIRE PROVIDED WITH FIXED ABRASIVE GRAINS EACH INCLUDING A CORE COATED WITH A HARD FILM

(75) Inventors: Chien-Chih Kung, Taoyuan County (TW); Ching-Yu Tso, Taoyuan County (TW); Shang-Wanq Yeh, Taoyuan County (TW); Hsiou-Jeng Shy, Taoyuan County (TW)

(73) Assignee: Chung-Shan Institute of Science and Technology, Armaments, Bureau, Ministry of National Defense, Taoyuan (TW)

( * ) Notice: Subject to any disclaimer, the term of this patent is extended or adjusted under 35 U.S.C. 154(b) by 266 days.

(21) Appl. No.: 13/239,563

(22) Filed: Sep. 22, 2011

(65) Prior Publication Data

US 2013/0074820 A1    Mar. 28, 2013

(51) Int. Cl.
 *B28D 1/08* (2006.01)
(52) U.S. Cl.
 USPC ............................ 125/21; 125/22; 125/16.02
(58) Field of Classification Search
 USPC ........... 125/21, 22, 16.02; 451/296, 278, 330; 205/110
 See application file for complete search history.

(56) References Cited

U.S. PATENT DOCUMENTS

| | | | | |
|---|---|---|---|---|
| 2,793,478 A * | 5/1957 | Rohowetz | ...................... | 451/539 |
| 4,015,931 A * | 4/1977 | Thakur | ........................... | 125/21 |
| 4,913,708 A * | 4/1990 | Kalinowski | ..................... | 51/295 |
| 5,216,999 A * | 6/1993 | Han | ................................ | 125/21 |
| 5,218,949 A * | 6/1993 | Tomlinson et al. | ............. | 125/21 |
| 6,915,796 B2 * | 7/2005 | Sung | ................................ | 125/21 |
| 7,089,925 B1 * | 8/2006 | Lin et al. | ......................... | 125/21 |
| 7,270,596 B2 * | 9/2007 | Doan | ............................. | 451/36 |
| 7,704,127 B2 | 4/2010 | Taniguchi et al. | | |
| 8,348,728 B2 * | 1/2013 | Ido et al. | ....................... | 451/541 |
| 2002/0100469 A1 * | 8/2002 | Shimazaki et al. | ............. | 125/21 |
| 2005/0155595 A1 * | 7/2005 | Kondo et al. | ................... | 125/21 |
| 2010/0167634 A1 * | 7/2010 | Ido et al. | ....................... | 451/548 |

FOREIGN PATENT DOCUMENTS

JP         06262526 A  * 9/1994  .............. B24D 3/00

\* cited by examiner

*Primary Examiner* — George Nguyen
(74) *Attorney, Agent, or Firm* — Jackson IPG PLLC

(57) ABSTRACT

A fret saw includes a cutting wire and fixed abrasive grains provided on the cutting wire by electroplating. Each of the fixed abrasive grains includes a core and a hard film coated on the core. The core is 1 to 60 micrometers in diameter. The core is made of a material selected from the group consisting of a Ti metal and a Ti alloy. The hard film is 1 to 40 micrometers thick. The hard film covers about 30% to 90% of the surface of the core.

9 Claims, 7 Drawing Sheets

FRET SAW INCLUDING A CUTTING WIRE PROVIDED WITH FIXED ABRASIVE GRAINS EACH INCLUDING A CORE COATED WITH A HARD FILM

BACKGROUND OF INVENTION

1. Field of Invention

The present invention relates to a fret saw including a cutting wire provided, by electroplating, with fixed abrasive grains each including a core coated with a hard film and, more particularly, to a fret saw including a cutting wire provided with fixed abrasive grains each including a metal or alloy core coated with a diamond or boron nitride film.

2. Related Prior Art

Electro-optical industry has been booming recently, and there are growing needs for silicon wafers, sapphire and agate that are hard. The silicon wafers are needed for the development of integrated circuits ("IC"). In the production of the IC, a wafer-slicing process is needed. The wafer-slicing process however often causes loss of materials, and the cost of the wafer-slicing process is therefore high. Obviously, there is a need for an excellent wafer-slicing process.

The wafer slicing may be conducted by a fret saw together with abrasive materials. The abrasive materials are classified into free abrasive grains and fixed abrasive grains. The free abrasive grains are included in abrasive paste and the abrasive paste is provided onto the fret saw in the wafer slicing. The wafer slicing by the free abrasive grains and the fret saw is not efficient, not precise and not environmentally friendly. The fixed abrasive grains are provided on the surface of the fret saw by adhesion, electroplating or electroless plating. The wafer slicing by the fixed abrasive grains and the fret saw is relatively efficient, precise and environmentally friendly. Therefore, the fret saws are used with the fixed abrasive grains in most cases to promote the efficiencies.

Fixed abrasive grains are generally super hard abrasive grains made of cubic boron nitride ("CBN") or diamond. The super hard abrasive grains are bonded to a cutting wire by synthetic resin or electroplating. The super hard abrasive grains could be detached from the cutting wire more easily where the super hard abrasive grains are bonded to the cutting wire by the synthetic resin than where the super hard abrasive grains are bonded to the cutting wire by the synthetic resin. It however takes longer to bond the super hard abrasive grains to the cutting wire by electroplating than by synthetic resin. To increase the speed of the production of the fret saws, there have been various attempts to coat Ti, Ni or Cu on the super hard abrasive grains. However, the super hard abrasive grains pile up during the electroplating and some of them are detached from the cutting wire inevitably. This is a waste of the super hard abrasive grains and reduces the life of the fret saws.

To overcome the foregoing problem, as disclosed in U.S. Pat. No. 7,704,127, "Electrodeposited Wire Tool", the thickness of the metal coating on a super hard abrasive grain is controlled to be smaller than 0.1 micrometer and is preferably 0.05 micrometer. Alternatively, the weight of the metal coating is controlled to be smaller than 10% and preferably 5% of the weight of a super hard abrasive grain. Thus, the super hard abrasive grains are not made with excessively high electric conductivity. Hence, the super hard abrasive grains do not pile up during the electroplating. Moreover, the speed of the electroplating exceeds 1 meter/minute. The super hard abrasive grains are made of diamond that is expensive. The super hard abrasive grains are often very different from one another in size and shape. Therefore, when the fret saw is used to slice a wafer or sapphire, the Kerf loss is high, and V-shaped notches could easily occur.

There have been attempts to merge diamond with metal to form super hard abrasive grains. However, it is still difficult to control the shapes of the super hard abrasive grains. The costs of the super hard abrasive grains are still high. The super hard abrasive grains still pile up during the electroplating.

Diamond films have gained a lot of attention since 1980s. There were many researches for diamond films around the world from mid 1980s to late 1990s. Diamond films are often used in optical components, microelectronic components, surface acoustic wave ("SAW") devices and radiation-resistant electronic components. Most of the efforts were made on the diamond films and equipment for making the diamond films. Only a few of them were made on the use of the diamond films on tools such as polishing tools, milling cutters, welding tools, wire-drawing die cores, grinding wheels and precision bearings for example. For instance, CemeCon has built a CCDia production line.

However, the super hard abrasive grains made of diamond are expensive. Moreover, the super hard abrasive grains made of diamond must be coated with metal to increase the speed of the electroplating. Furthermore, it is difficult to control the shapes and sizes of the super hard abrasive grains made of diamond, and it is a waste of time and cost to screen the super hard abrasive grains made of diamond.

The present invention is therefore intended to obviate or at least alleviate the problems encountered in prior art.

SUMMARY OF INVENTION

It is an objective of the present invention to provide a fret saw with a cutting wire and fixed abrasive grains that can easily be controlled in shape and size.

It is another objective of the present invention to provide a fret saw with a cutting wire and fixed abrasive grains that do not pile up excessively.

It is another objective of the present invention to provide a fret saw with fixed abrasive grains firmly bonded to a cutting wire.

It is another objective of the present invention to provide an inexpensive fret saw.

It is another objective of the present invention to provide a fret saw that can be made efficiently.

To achieve the foregoing objectives, each of the abrasive grains includes a core and a hard film coated on the core. The core is 1 to 60 micrometers in diameter and made of a Ti metal or a Ti alloy. The hard film is 1 to 40 micrometers thick and covers about 30% to 90% of the surface of the core.

In an aspect, there is TiC formed between the core and the hard film, wherein the TiC is 0.05 to 0.5 micrometer thick.

In another aspect, the Ti metal is Si, Ta, Mo, W, Cr, V, Cu, Al or Fe.

In another aspect, the Ti alloy is any combination of Si, Ta, Mo, W, Cr, V, Cu, Al and Fe.

In another aspect, the core is in the form of a sphere, a pyramid, a tetrahedron, a hexahedron or an octahedron.

In another aspect, the hard film is made of diamond, boron nitride or aluminum oxide.

In another aspect, the core includes a rough or porous surface.

In another aspect, the cutting wire is made of steel and made with a diameter of 1.6 mm.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 5:
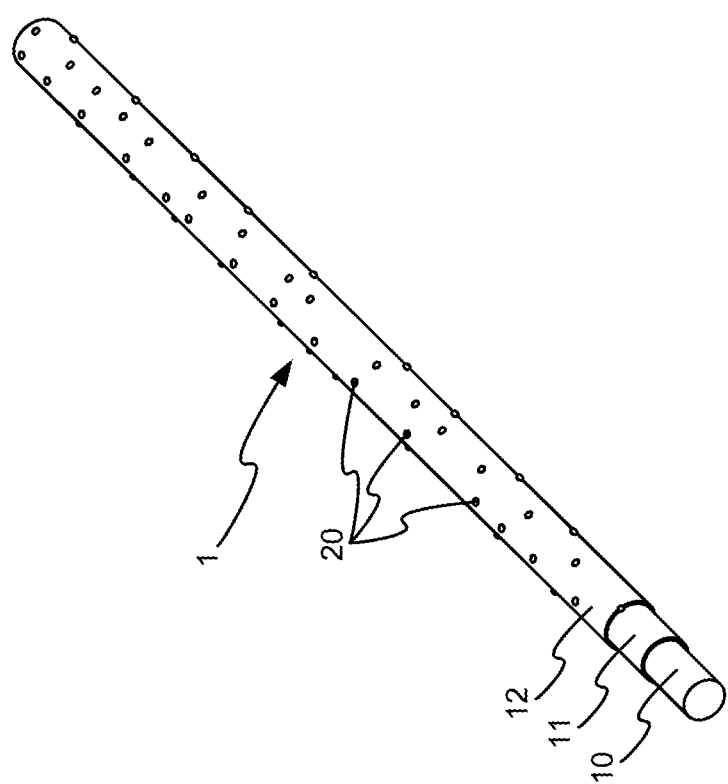
FIG. 5 is partial, perspective view of a fret saw according to the preferred embodiment of the present invention.

Referring to FIG. 5, there is shown a fret saw 1 according to the preferred embodiment of the present invention. The fret saw 1 includes a cutting wire 10 and a plurality of fixed abrasive grains 20 secured to the cutting wire 10 by electroplating for example.

Figure 1:
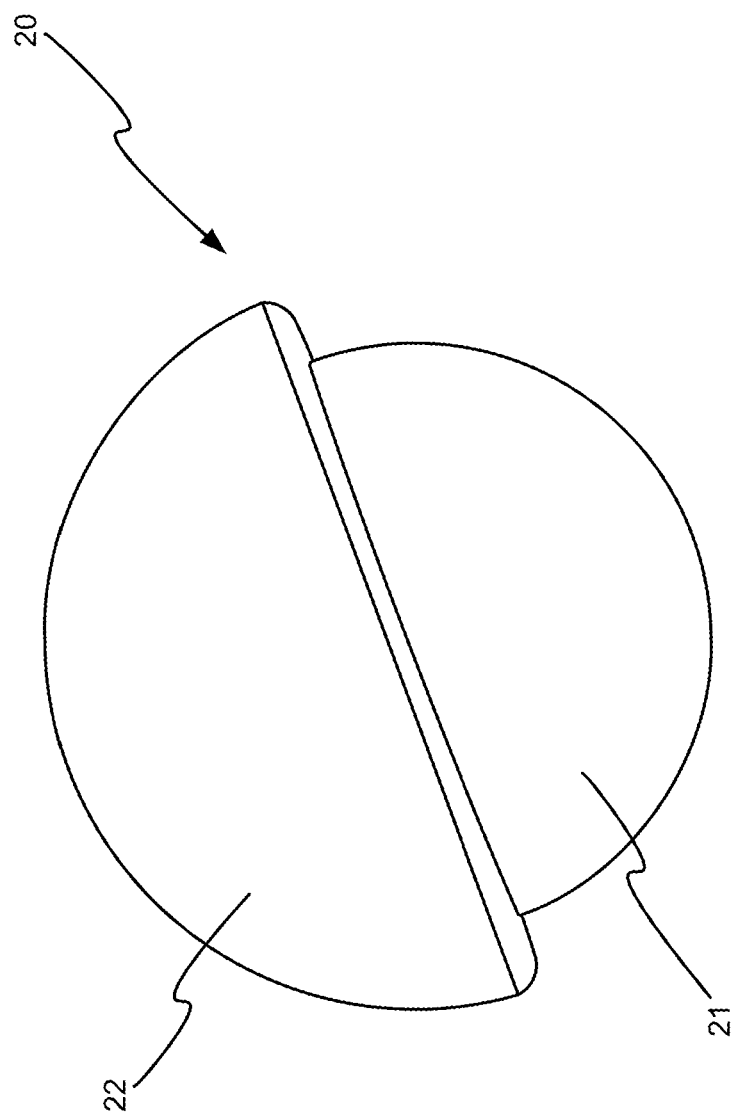
FIG. 1 is a front view of an abrasive grain according to the preferred embodiment of the present invention.

Referring to FIG. 1, each of the fixed abrasive grains 20 includes a core 21 and a hard film 22 coated on the core 21. In the manufacturing of the fixed abrasive grains 20, the cores 21 are made with diameters of 1 to 60 micrometers and more preferably 15 to 25 micrometers. The cores 22 may be made of a Ti metal or a Ti alloy. The cores 21 are washed with alkali to remove grease or oil and washed with acid to activate and remove undesired substances. The cores 21 are coated with the hard films 22 by chemical vapor deposition ("CVD"). The hard films 22 may be made of diamond, boron nitride or aluminum oxide. The hard films 22 are 1 to 40 micrometers and more particularly 10 to 15 micrometers in thickness. For each of the fixed abrasive grains 20, the hard film 22 covers 30% to 90% of the surface of the core 21. The cores 21 coated with the hard films 22 are heated in a vacuum oven. The pressure is about $10^{-1}$ to $10^{-4}$ Pa in the vacuum oven while the temperature is about 800° C. to 1000° C. in the vacuum oven. The heating lasts about 20 minutes. Thus, TiC is formed between the core 21 and the hard film 22 of each of the fixed abrasive grains 20. The TiC is about 0.05 to 0.5 micrometers and more preferably 0.2 to 0.4 micrometers in thickness. Thus, the fixed abrasive grains 20 are made. The core 21 may be in the form of a sphere, a pyramid, a tetrahedron, a hexahedron, an octahedron or the like. The core 21 may include a rough or porous surface. The Ti metal may be Si, Ta, Mo, W, Cr, V, Cu, Al or Fe. The Ti alloy may be any combination of Si, Ta, Mo, W, Cr, V, Cu, Al and Fe.

Figure 2:
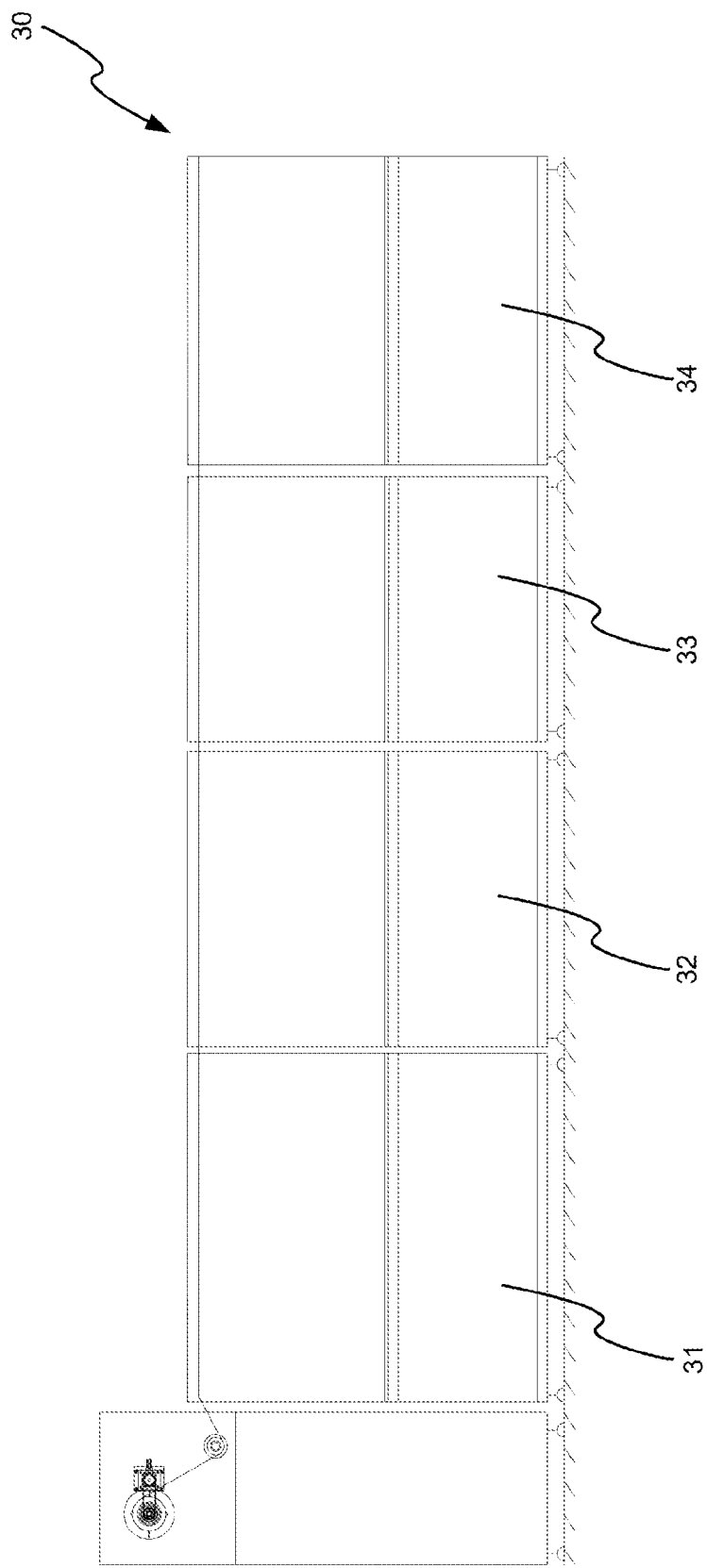
FIG. 2 is a front view of a machine for making a fret saw including abrasive grains as the one shown in FIG. 1.

Referring to FIG. 2, there is provided a machine 30 for securing the abrasive grains 20 to the cutting wire 10. The machine 30 includes a washing tank 31, a preliminary coating layer 32, an abrasive grain-providing tank 33 and a primary coating tank 34. The cutting wire 10 is a wire that is generally used in a piano and made with a diameter of 1.6 mm.

In the washing tank 31, oil or grease is removed from the cutting wire 10, and other undesired substances are activated and removed from the cutting wire 10.

Figure 3:
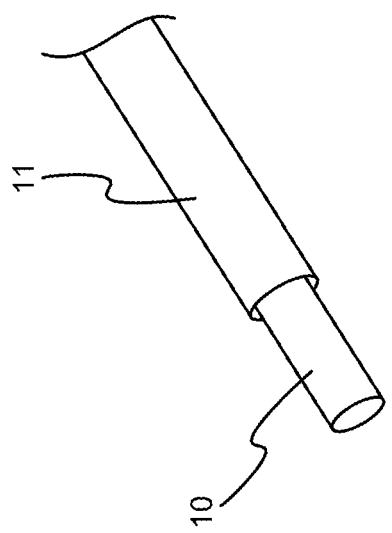
FIG. 3 is partial, perspective view of a cutting wire and a preliminary coating of a fret saw according to the preferred embodiment of the present invention.

In the preliminary coating layer 32, by electroplating, the cutting wire 10 is coated with a preliminary coating 11 as shown in FIG. 3. The preliminary coating 11 is made of Ni and made with a thickness of about 10 micrometers.

Figure 4:
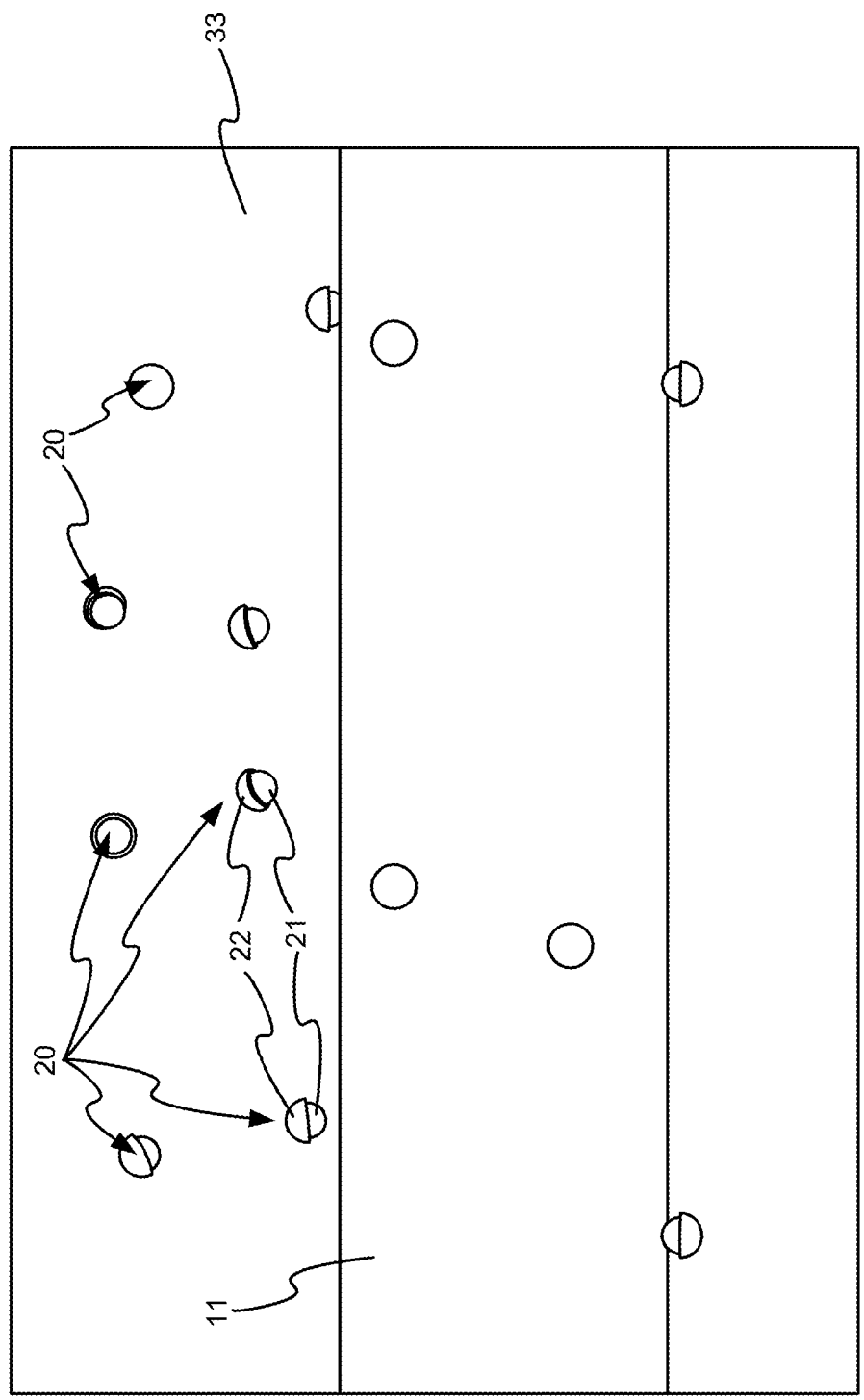
FIG. 4 is an enlarged, partial, front view of abrasive grains as the one shown in FIG. 1 attached to the cutting wire by the preliminary coating shown in FIG. 3.
Figure 6:
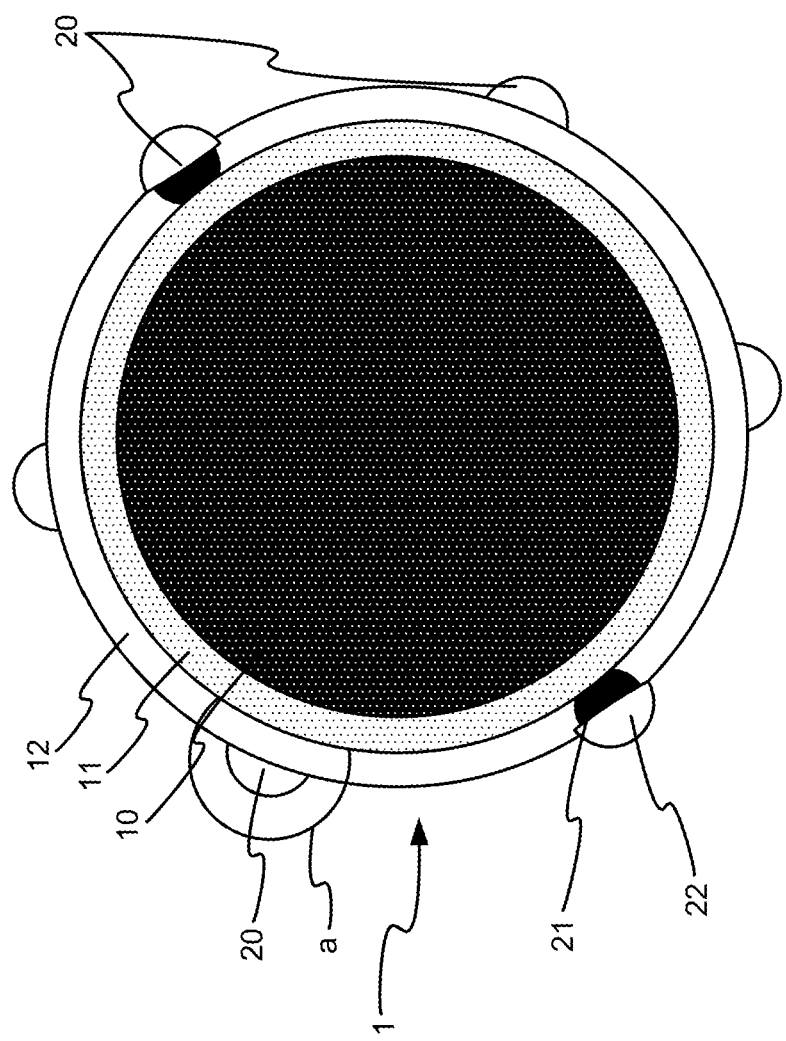
FIG. 6 is a cross-sectional view of the fret saw shown in FIG. 5.
Figure 7:
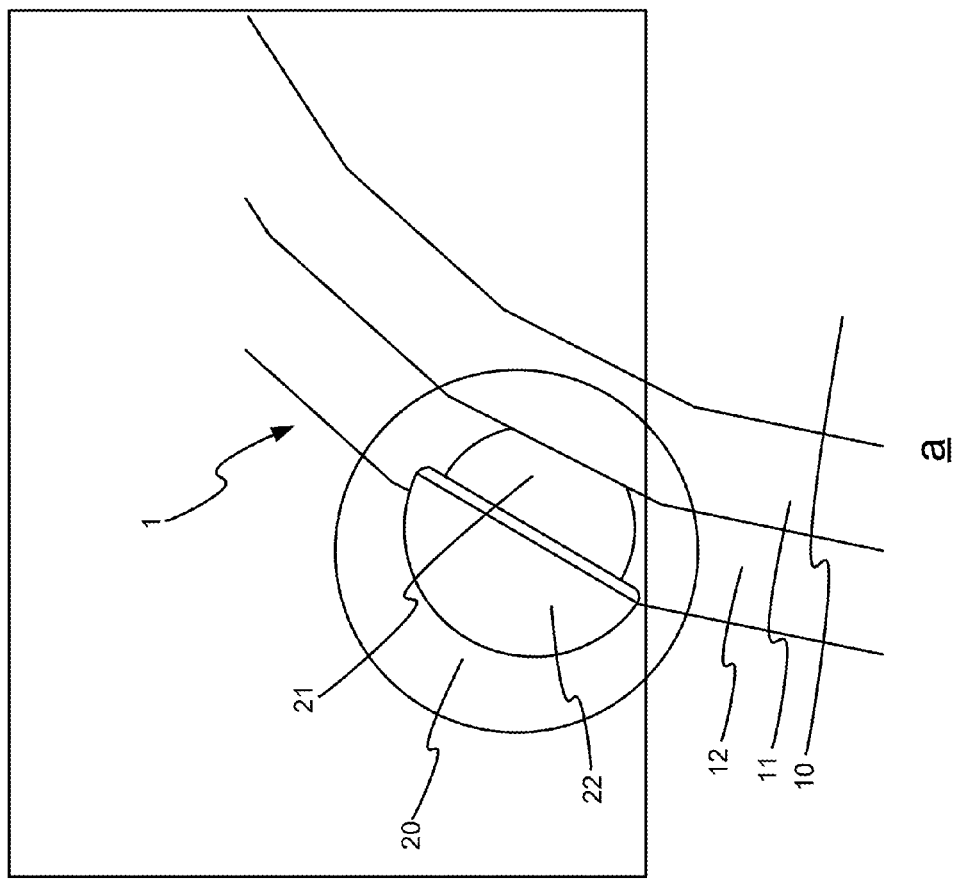
FIG. 7 is an enlarged, cross-sectional view of a portion of the fret saw represented by "A" shown in FIG. 6.

In the abrasive grain-providing tank 33, by electroplating, the abrasive grains 20 are secured to the cutting wire 10 as shown in FIG. 4. Then, by electroplating, a primary coating 12 is provided on the cutting wire 10 and the abrasive grains 20. The primary coating 12 is made of Ni and made with a thickness of 10 micrometers. Finally, the fret saw 1 is subjected to a heat treatment at 200° C. to 250° C. for 2 hours so that it is quenched. Thus, the fret saw 1 is made with a diameter of 2.1 to 2.3 mm as shown in FIGS. 5 through 7. The fret saw 1 can be made with various diameters and lengths and used in various tools such as jigsaws and scroll saws.

According to the present invention, the fret saw 1 includes the cutting wire 10 provided, on the surface, with the fixed abrasive grains 20 each including the metal or alloy-based core 21 coated with the hard film 22 made of diamond or boron nitride. Thus, the cost of the fixed abrasive grains 20 is reduced. Moreover, it is easy to control the shape and size of the metal or alloy-based core 21. Furthermore, the metal or alloy-based core 21 is excellently electrically conductive so that there is difference of electrical conductivity between the portion of the core 21 of each of the fixed abrasive grains 20 covered by the hard coating 22 and the other portion not covered by the hard coating 22. During the electroplating, since the hard coating 22 coated on the core 21 is made of diamond or boron nitride, there is only a small current traveling through the hard coating 22 made of diamond or boron nitride. Thus, the piling up of the fixed abrasive grains is reduced, and the speed of the electroplating is increased.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A fret saw including:
   a cutting wire; and
   fixed abrasive grains provided on the cutting wire by electroplating and each made with a core and a hard film coated on the core,
   wherein the core is 1 to 60 micrometers in diameter and made of a material selected from the group consisting of a Ti metal and a Ti alloy,
   wherein the hard film is 1 to 40 micrometers thick and covers about 30% to 90% of the surface of the core.

2. The cutting wire according to claim 1,
   wherein there is TiC formed between the core and the hard film,
   wherein the TiC is 0.05 to 0.5 micrometer thick.

3. The cutting wire according to claim 1,
   wherein the Ti metal is selected from the group consisting of Si, Ta, Mo, W, Cr, V, Cu, Al and Fe.

4. The cutting wire according to claim 1,
   wherein the Ti alloy is a combination of at least two materials elected from the group consisting of Si, Ta, Mo, W, Cr, V, Cu, Al and Fe.

5. The cutting wire according to claim 1,
   wherein the core is in a shape selected from the group consisting of a sphere, a pyramid, a tetrahedron, a hexahedron and an octahedron.

6. The cutting wire according to claim 1,
wherein the hard film is made of a material selected from the group consisting of diamond, boron nitride and aluminum oxide.

7. The cutting wire according to claim 1,
wherein the core includes a rough surface.

8. The cutting wire according to claim 1,
wherein the core includes a porous surface.

9. The cutting wire according to claim 1,
wherein the cutting wire is made of steel and made with a diameter of 1.6 mm.

* * * * *